United States Patent
Boone et al.

(10) Patent No.: US 7,255,488 B1
(45) Date of Patent: Aug. 14, 2007

(54) NETWORK ELEMENT CONNECTOR ASSEMBLY INCLUDING STACKED ELECTRICAL AND OPTICAL CONNECTOR INTERFACES

(75) Inventors: Earl W. Boone, Round Rock, TX (US); James W. Edwards, III, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/758,653

(22) Filed: Jan. 15, 2004

(51) Int. Cl.
*G02B 6/38* (2006.01)
(52) U.S. Cl. ...................................................... 385/75
(58) Field of Classification Search ................ 385/75; 439/577, 620, 490
See application file for complete search history.

(56) References Cited

U.S. PATENT DOCUMENTS

| | | | |
|---|---|---|---|
| 5,336,109 A | 8/1994 | Hillbish et al. | 439/541.5 |
| 5,419,717 A * | 5/1995 | Abendschein et al. | 439/577 |
| 5,876,240 A | 3/1999 | Derstine et al. | 439/490 |
| 6,019,631 A | 2/2000 | Chen | 439/541.5 |
| 6,080,011 A | 6/2000 | Tsao et al. | 439/541.5 |
| 6,120,318 A | 9/2000 | Reed et al. | 439/490 |
| 6,692,159 B2 * | 2/2004 | Chiu et al. | 385/53 |
| 6,854,895 B2 * | 2/2005 | Coffey et al. | 385/53 |
| 2005/0063647 A1 * | 3/2005 | Thornton et al. | 385/89 |

\* cited by examiner

*Primary Examiner*—Javaid H. Nasri
(74) *Attorney, Agent, or Firm*—Campbell Stephenson LLP

(57) ABSTRACT

A network element connector assembly including Stacked electrical and optical connector is disclosed. According to one embodiment, an apparatus is provided which includes an optical connector interface to couple an optical network connector with a mounting surface, an electrical connector interface to couple an electrical network connector with the mounting surface, where the optical connector interface and electrical connector interface are vertically aligned with one another with respect to the mounting surface, and where the optical connector interface and electrical connector interface are associated with a network element port.

25 Claims, 4 Drawing Sheets

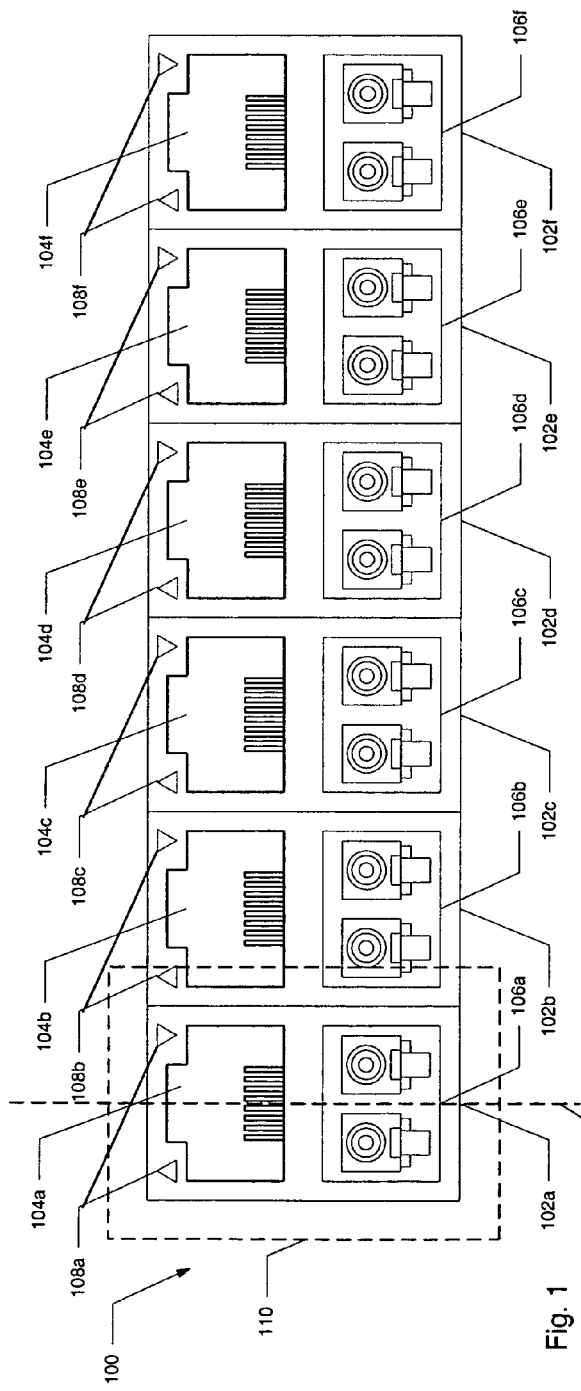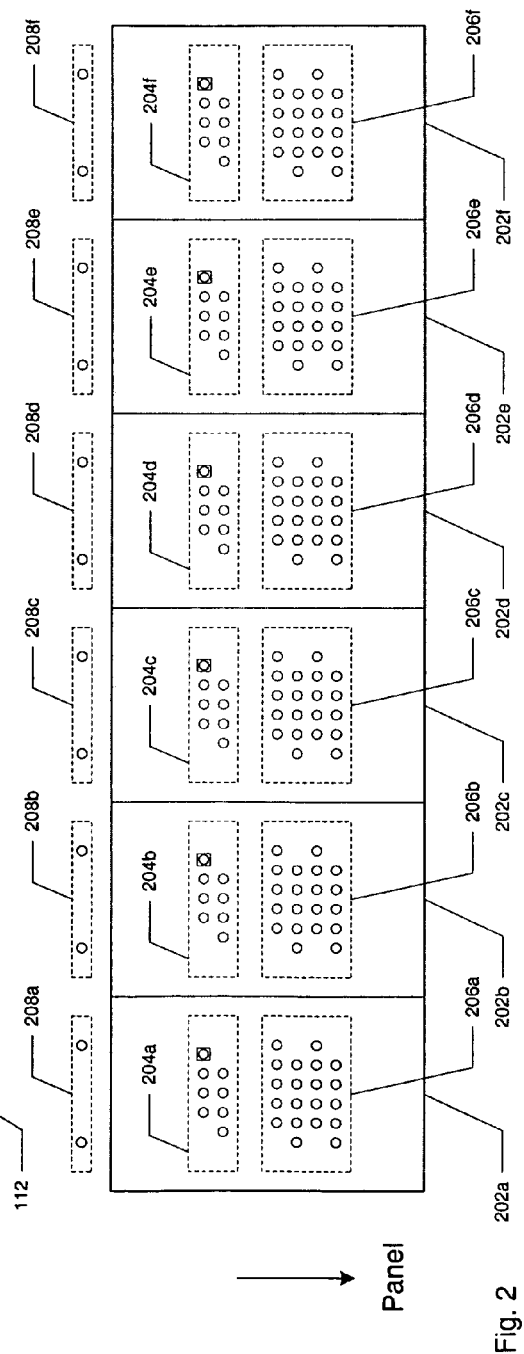
Fig. 1
Fig. 2

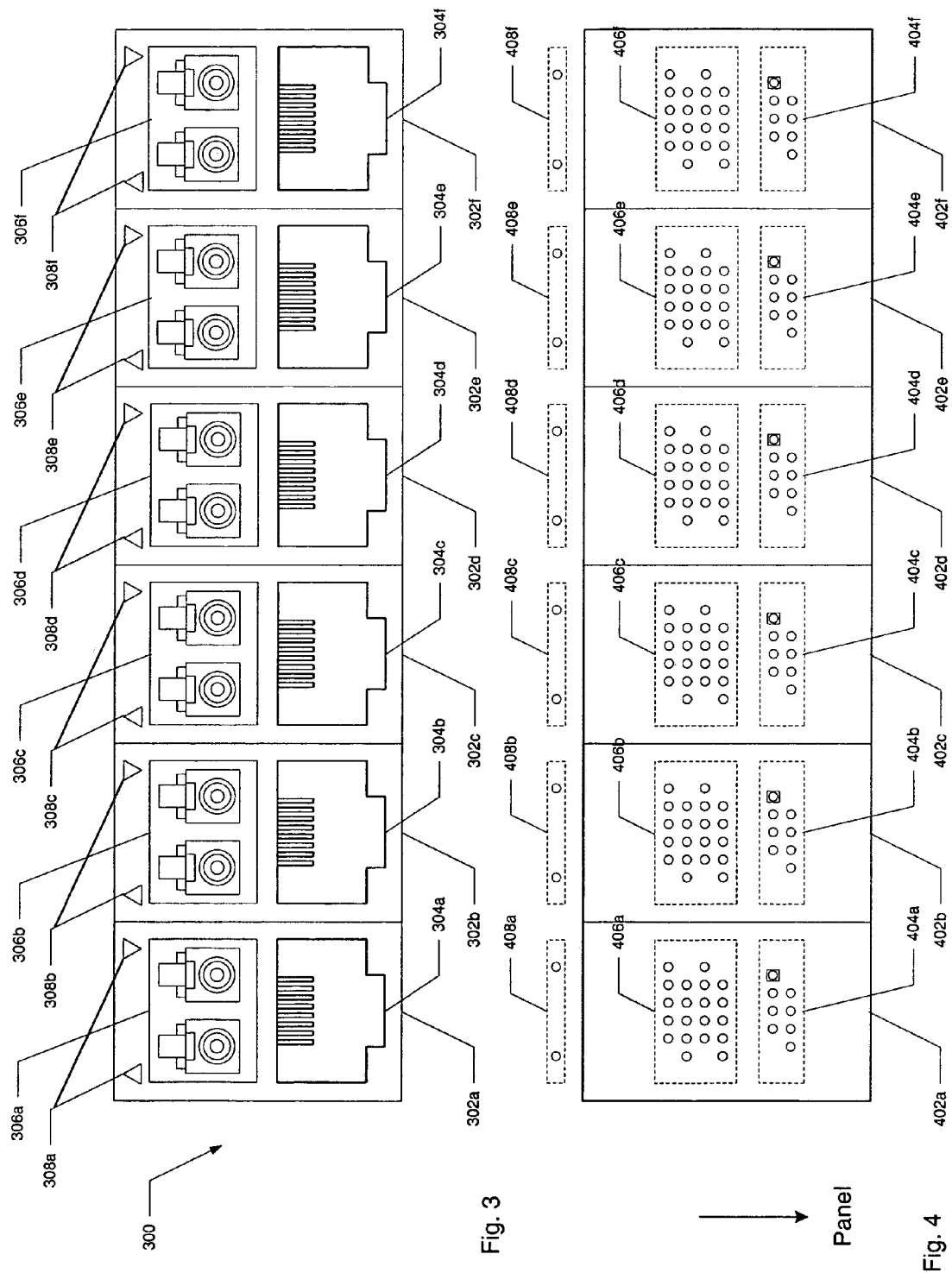

NETWORK ELEMENT CONNECTOR ASSEMBLY INCLUDING STACKED ELECTRICAL AND OPTICAL CONNECTOR INTERFACES

BACKGROUND OF THE INVENTION

1. Field of the Invention

The present invention relates generally to network element connectors and ports and more particularly to a network element connector assembly including stacked electrical and optical connector interfaces.

2. Description of the Related Art

In a conventional network element (e.g., a router, switch, host, server, client, network-attached storage device or array, or the like), one or more connection points or "ports" are defined on a mounting surface (e.g., a printed circuit board) for coupling the network element to a physical communications medium via a network connector (e.g., a registered-jack (RJ) plug, a gigabit interface converter (GBIC) connector, a small form factor (SFF) connector, small form factor pluggable (SFP), or the like). Each port includes a single connector interface to receive a network connector and its own physical layer protocol circuit or "PHY" for converting data between physical layer and higher layer (e.g., data link layer) formats. More recently, so-called "auto-media detection" physical layer protocol circuits have been developed which enable a network element to detect the presence and/or availability of multiple interfaces (e.g., network connectors) to one or more physical connection mediums.

Such "auto-media detection PHYs" can be used in a failover/recovery configuration including one or more optical connector interfaces and one or more electrical connector interfaces. In one existing network element connector assembly used in conjunction with an auto-media detection PHY, an electrical connector interface and an optical connector interface are coupled, horizontally adjacent to one another, to a mounting surface. Using the described assembly, each electrical connector interface and optical connector interface pair is associated with a network element port and an auto-media detection PHY. However, the number of ports which may be defined with network elements using the described assembly (roughly one-half that attainable with conventional connector non-auto-media-detection PHYs) is undesirable.

In another existing network element connector assembly, a set of "stacked" electrical connector interfaces is coupled, horizontally adjacent to a set of "stacked" optical connector interfaces, to a mounting surface. While the described assembly yields port densities approximately equal to those attainable with conventional non-auto-media-detection PHYs, the described assembly design suffers from a number of shortcomings. Because each auto-media detection PHY must be routed to an optical connector interface and electrical connector interface pair, so-called "cross-talk" interference is frequently generated between adjacent connector interface contacts, traces, or the like potentially resulting in signal transmission errors. Moreover, where there are more than two interfaces within each of the described sets of stacked electrical and/or optical connector interfaces, the correlation or association of individual electrical and optical connector interfaces may not be easily understood by an end user, leading to physical connection errors.

SUMMARY OF THE INVENTION

Disclosed is a network element connector assembly including Stacked electrical and optical connector interfaces. Embodiments of the present invention may be used to present a single network element port to a user which includes both an optical connector interface and an electrical connector interface coupled to a mounting surface where the optical connector interface and electrical connector interface are vertically adjacent to one another with respect to a mounting surface. According to one embodiment, the described electrical connector interface is a registered jack 45 (RJ-45) interface.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which:

FIG. 1 illustrates a network element connector assembly including upper electrical connector interfaces and lower optical connector interfaces according to an embodiment of the present invention;

FIG. 2 illustrates a contact layout diagram of the network element connector assembly of FIG. 1 according to an embodiment of the present invention;

FIG. 3 illustrates a network element connector assembly including upper optical connector interfaces and lower electrical connector interfaces according to an embodiment of the present invention;

FIG. 4 illustrates a contact layout diagram of the network element connector assembly of FIG. 3 according to an embodiment of the present invention;

The use of the same reference symbols in different drawings indicates similar or identical items.

DETAILED DESCRIPTION

Figure 5:
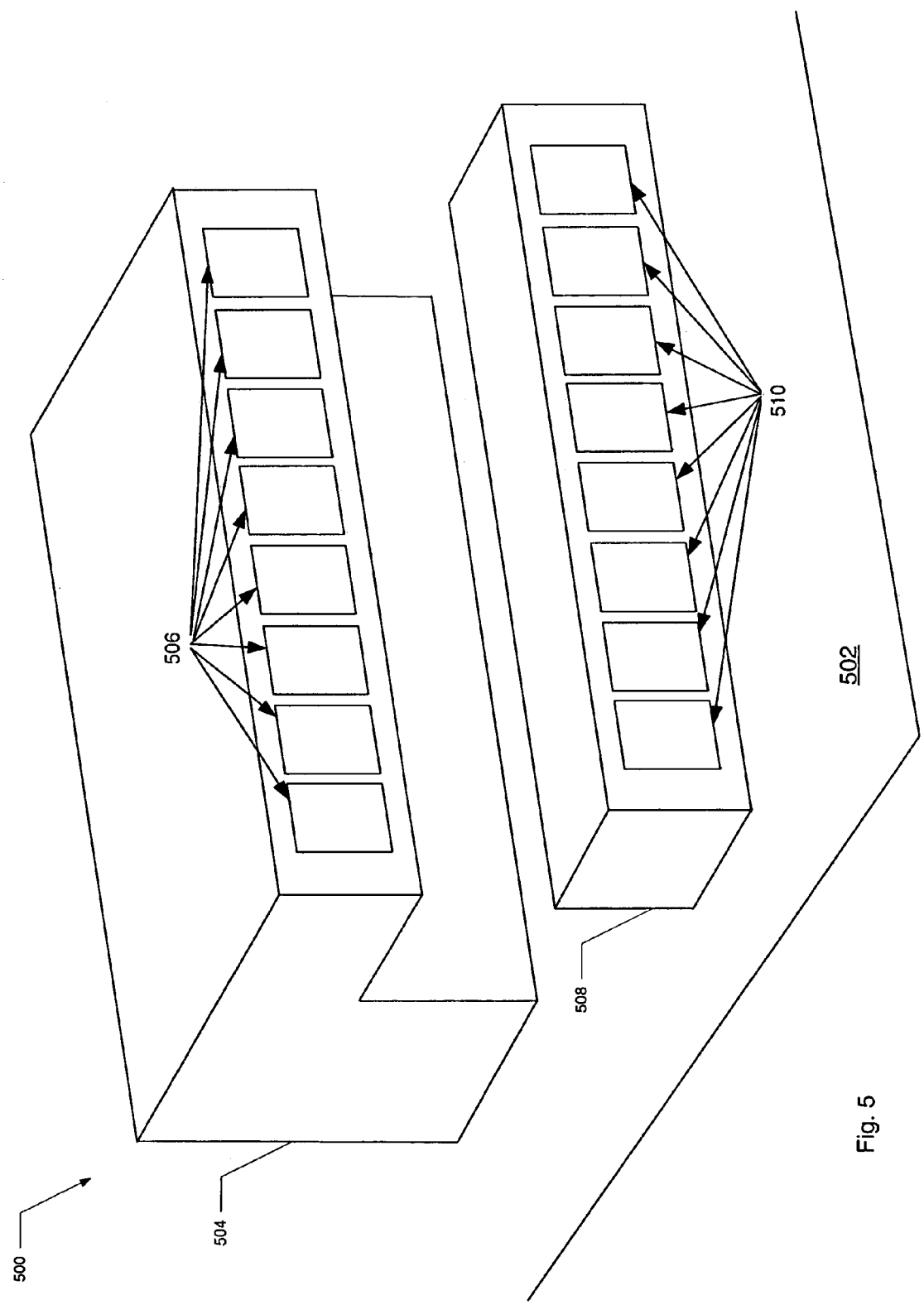
FIG. 5 illustrates a perspective view of a network element connector assembly according to an embodiment of the present invention.

Although the present invention has been described in connection with one or more specific embodiments, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

According to one embodiment of the present invention, a network element connector assembly is provided including stacked electrical and optical connector interfaces. In the described embodiment, optical and electrical connector interfaces are provided within a network element connector assembly such that sets of shared (e.g., between a single port) optical and electrical connector interfaces are vertically adjacent to one another with respect to a mounting surface (e.g., a printed circuit board or card). Consequently, the routing of the described connector interfaces to associated auto-media detection PHYs is alternated between optical and electrical connector interfaces, thereby reducing crosstalk interference.

FIG. 1 illustrates a network element (NE) connector assembly including upper electrical connector interfaces and lower optical connector interfaces according to an embodiment of the present invention. The NE connector assembly 100 depicted in FIG. 1 includes a plurality of network element ports 102a-102f each including a corresponding upper electrical connector interface 104, a lower optical connector interface 106, a one or more visual indicators 108 to indicate which of the optical and electrical connector interfaces is active (i.e., transmitting and/or receiving signals, physically coupled to a connector, physically coupled to a connector which is available to transmit and/or receive signals, physically coupled to a connector which is transmitting and/or receiving signals, or the like) within that network element port.

While a particular number of network element ports have been illustrated in the embodiment of FIG. 1, embodiments of the present invention may be implemented with any number of NE ports. Similarly, although a particular orientation of each of electrical connector interfaces 104 and optical connector interfaces 106 has been shown which enables a user to easily mate/insert and un-mate/remove associated connectors, no particular orientation of connector interfaces is required. According to one embodiment of the present invention, a connector-receiving plane 110 and a connector-insertion plane is defined for each network element port 102. Electrical connector interfaces 104 and optical connector interfaces 106 are provided which are substantially adjacent to one another along the line(s) defined by the intersection(s) of the connector-receiving and connector-insertion plane(s) of each port. In the embodiment of FIG. 1, each of electrical connector interfaces 104a-104f includes a registered jack 45 (RJ-45) interface (i.e., an RJ-45 receptacle). An RJ-45 interface is a keyed or unkeyed single-line jack for digital transmission over twisted or untwisted phone wire including eight electrical contacts (e.g., pins or positions). In alternative embodiments of the present invention, other types of registered jack electrical connector interfaces may be implemented (e.g., RJ-11, RJ-14, or the like).

Similarly, while an LC-type interface of a small form factor pluggable (SFP) transceiver module including separate optical transmit and receive contacts has been illustrated for each of optical connector interfaces 106a-106f, the depicted optical connector interfaces may alternatively include any existing optical connector interface (e.g., VF-45, MT-RJ, GBIC, or the like) or any combination thereof. Moreover, an optical connector interface of an embodiment of the present invention may not necessarily include an optical transceiver module. In alternative embodiments of the present invention, for example, one or more optical connector interfaces may include a cage subassembly and/or a transceiver interface (e.g., an SFP transceiver module interface including a housing, one or more mounting surface contacts, and transceiver module contacts).

In the embodiment of FIG. 1, visual indicators 108 are used to indicate to a user which of the optical and electrical connector interfaces is active at a given time. In the depicted embodiment, a directionally-shaped visual indicator (e.g., a visual indicator having a directional shape such as an arrow, triangle, teardrop, or the like) is provided at each network element port for each associated network connector interface. According to one embodiment of the present invention, when an electrical connector interface 104a is active within network element port 102a, an upward-directed visual indicator 108 is illuminated and when an optical connector interface 106a is active within network element port 102a, a downward-directed visual indicator 108 is illuminated. In alternative embodiments of the present invention, however, a greater or lesser number of visual indicators 108 and non-directionally-shaped visual indicators 108 can be provided. Similarly, visual indicators 108 do not have to be positioned as shown with respect to network element ports 102 but may be positioned anywhere on an associated network element so long as their position does not prevent their use in indicating the activity of their associated optical and electrical connector interfaces to a user. Visual indicators 108 may include light pipes, light-emitting diodes (LEDs), or the like and their illumination can be controlled and/or provided by an associated PHY or other network element component.

FIG. 2 illustrates a contact layout diagram of the network element connector assembly of FIG. 1 according to an embodiment of the present invention. In the illustrated embodiment, a footprint 202a-202f is depicted corresponding to each of network element ports 102a-102f. One or more groupings of contacts (e.g., optical connector interface contact groups 206a-206f and electrical connector interface contact groups 204a-204f) are provided within each corresponding footprint 202a-202f and positioned as shown with respect to a network element front panel. In the illustrated embodiment of FIG. 2, a visual indicator contact group 208a-208f is additionally provided outside each of the network element port footprints as shown.

In alternative embodiments of the present invention, visual indicator contact groups 208a-208f may be integrated within footprints 202a-202f and an associated network element connector assembly housing (not illustrated). In the illustrated embodiment each contact within contact groups 202, 204, and 206 includes an electrical or optical signal contact, however additional contacts (e.g., alignment contacts or the like) may be provided in alternative embodiments. Each contact within contact groups 202, 204, and 206 may be of any of a variety of known contact types, (e.g., press-fit, surface mount, conventional soldering, ball-grid array, or the like).

FIG. 3 illustrates a network element connector assembly including upper optical connector interfaces and lower electrical connector interfaces according to an embodiment of the present invention. The NE connector assembly 300 depicted in FIG. 3 includes a plurality of network element ports 302a-302f each including a corresponding upper optical connector interface 306, a lower electrical connector interface 304, a one or more visual indicators 308 to indicate which of the optical and electrical connector interfaces is active (i.e., transmitting and/or receiving signals, physically coupled to a connector, physically coupled to a connector which is available to transmit and/or receive signals, physically coupled to a connector which is transmitting and/or receiving signals, or the like) within that network element port.

While a particular number of network element ports have been illustrated in the embodiment of FIG. 3, embodiments of the present invention may be implemented with any number of NE ports. Similarly, although a particular orientation of each of electrical connector interfaces 304 and optical connector interfaces 306 has been shown which enables a user to easily mate/insert and un-mate/remove associated connectors, no particular orientation of connector interfaces is required. In the embodiment of FIG. 3, each of electrical connector interfaces 304a-304f includes a registered jack 45 (RJ-45) interface (i.e., an RJ-45 receptacle). An RJ-45 interface is a keyed or unkeyed single-line jack for digital transmission over twisted or untwisted phone wire including eight electrical contacts (e.g., pins or positions). In alternative embodiments of the present invention, other types of registered jack electrical connector interfaces can be implemented (e.g., RJ-11, RJ-14, or the like).

Similarly, while an LC-type interface of a small form factor pluggable (SFP) transceiver module including separate optical transmit and receive contacts has been illustrated for each of optical connector interfaces 306a-306f, the depicted optical connector interfaces can alternatively include any existing optical connector interface (e.g., VF-45, MT-RJ, GBIC, or the like) or any combination thereof. Moreover, an optical connector interface of an embodiment of the present invention may not necessarily include an optical transceiver module. In alternative embodiments of the present invention for example, one or more optical connector interfaces can include a cage subassembly and/or a transceiver interface (e.g., an SFP transceiver module interface including a housing, one or more mounting surface contacts, and transceiver module contacts).

FIG. 4 illustrates a contact layout diagram of the network element connector assembly of FIG. 3 according to an embodiment of the present invention. In the illustrated embodiment, a footprint 402a-402f is depicted corresponding to each of network element ports 302a-302f. One or more groupings of contacts (e.g., optical connector interface contact groups 406a-406f and electrical connector interface contact groups 404a-404f) are provided within each corresponding footprint 402a-402f positioned in order as shown with respect to a network element front panel. In the illustrated embodiment of FIG. 4, a visual indicator contact group 408a-408f is additionally provided outside each of the network element port footprints as shown.

FIG. 5 illustrates a perspective view of a network element connector assembly according to an embodiment of the present invention. In the illustrated embodiment, a network element connector assembly 500 is provided for coupling to a mounting surface 502 (e.g., a printed circuit board or card within a network element) including an upper connector interface portion and a lower connector interface portion as shown.

Upper connector interface portion of the illustrated embodiment includes a housing 504 (e.g., a plastic or dielectric material housing, an electro-magnetic interference (EMI) shield, a cage subassembly, or the like) having a plurality of apertures 506 therein defining a plurality of connector receiving cavities in or upon which electrical or optical connector interfaces (not illustrated) are provided. Lower connector interface portion of the illustrated embodiment similarly includes a housing 508 having a plurality of apertures 510 therein defining a plurality of connector receiving cavities in or upon which corresponding electrical or optical connector interfaces (not illustrated) are provided.

Although apertures 506 and 510 have been depicted as immediately adjacent to one another following the assembly of the upper connector interface and lower connector interface portions of network element connector assembly 500, in alternative embodiments of the present invention other elements (e.g., other connector interfaces) may be disposed there between. Similarly, while in the embodiments described herein upper connector interface portion and lower connector interface portion each contain either optical or electrical connector interfaces, in alternative embodiments uniformity of connector interfaces within an upper or lower portion of network element connector assembly 500 is not required. Rather, in one embodiment, optical and electrical connector interfaces are alternated horizontally while corresponding connector interfaces are provided in an alternate (i.e., upper or lower) portion.

Figure 6:
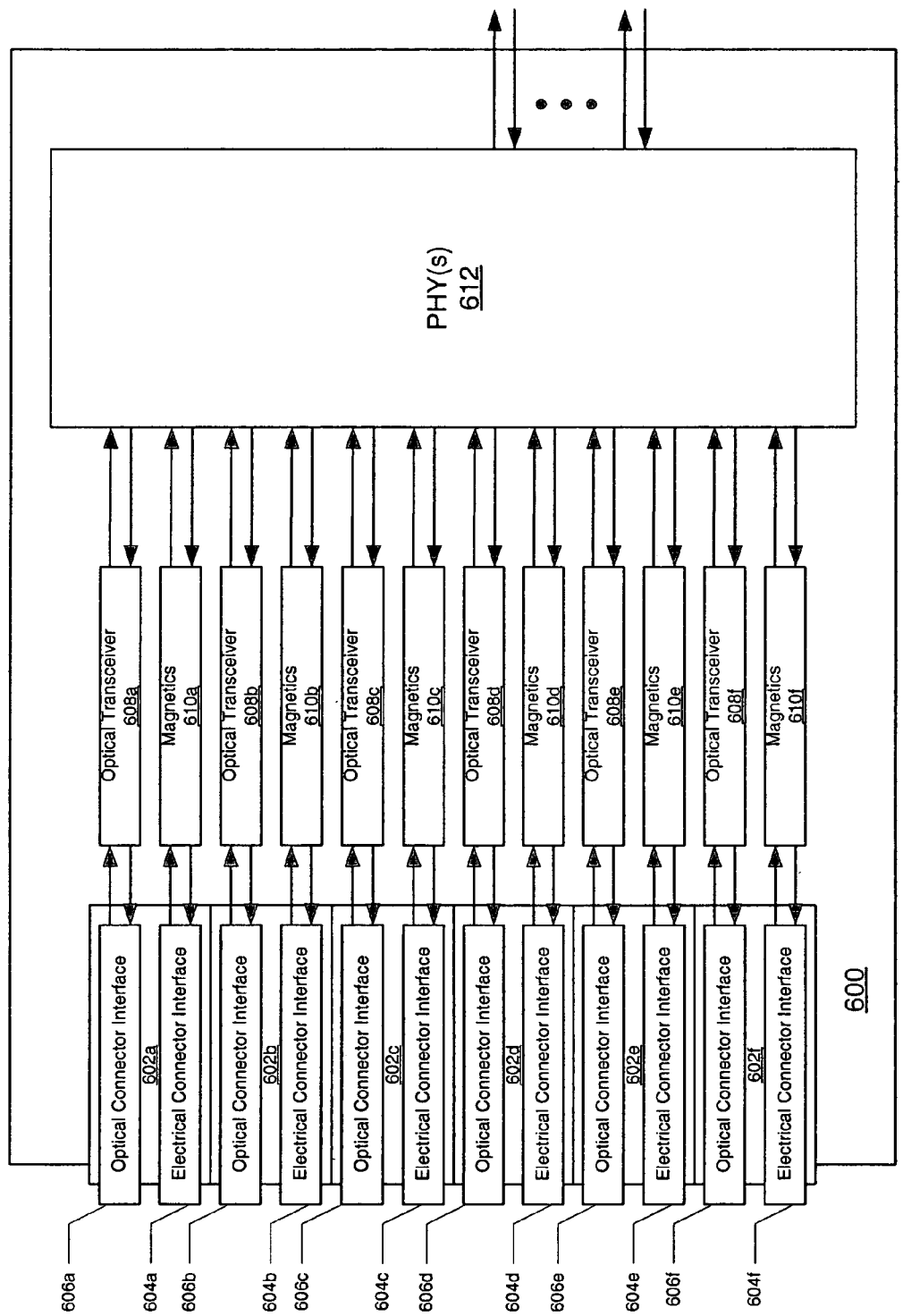
FIG. 6 illustrates a block diagram of a portion of a network element including a network element connector assembly according to an embodiment of the present invention.

FIG. 6 illustrates a functional block diagram of a portion of a network element including a network element connector assembly according to an embodiment of the present invention. A mounting surface 600 of the illustrated network element embodiment includes a plurality of network element ports 602a-602f each including an optical connector interface 606 and an electrical connector interface 604, a plurality of optical transceivers 608a-608f, a plurality of magnetics circuits 610a-610f including one or more magnetics components (e.g., transformers, inductors, or the like) used to electrically isolate a corresponding electrical connector interface 604 from the remainder of the network element, and an auto-media detection physical layer protocol circuit 612 coupled together as shown. While optical connector interfaces 606 and electrical connector interfaces 604 have been depicted next to one another within the embodiment of FIG. 6 for clarity of presentation, in one embodiment of the present invention some or all of optical connector interfaces 606, electrical connector interfaces 604, optical transceivers 608, and magnetics circuits may be layered vertically.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. An apparatus comprising:
   a network element port circuit comprising
      a first input/output (I/O) port, a second I/O port and a third I/O port;
      an optical connector interface coupled to said third I/O port and configured to
         couple an optical network connector to a mounting surface, and
         couple said optical network connector to said first I/O port;
      an electrical connector interface coupled to said third I/O port and configured to
         couple an electrical network connector to said mounting surface, and
         couple the electrical network connector to said second I/O port, wherein
            said optical connector interface and said electrical connector interface are vertically aligned with one another with respect to said mounting surface, and
            said electrical connector interface comprises a registered jack 45 (RJ-45) interface.

2. The apparatus of claim 1, wherein
   said optical connector interface comprises an interface of a small form factor pluggable (SFP) optical module.

3. The apparatus of claim 1, wherein
   said optical connector interface comprises an interface of a gigabit interface converter (GBIC) optical module.

4. The apparatus of claim 1, further comprising:
   an electrical isolation circuit coupled to said RJ-45 interface.

5. The apparatus of claim 4, wherein said electrical isolation circuit comprises one or more magnetics components.

6. The apparatus of claim 1, further comprising:
   a visual indicator to indicate which of said optical connector interface and said electrical connector interface is active on said network element port circuit.

7. The apparatus of claim 6, wherein
   said visual indicator comprises at least one of a light emitting diode and a light pipe.

8. The apparatus of claim 1, wherein
   said electrical connector interface comprises an upper connector interface of said network element port circuit, and
   said optical connector interface comprises a lower connector interface of said network element port circuit.

9. The apparatus of claim 1, further comprising:
   a first electromagnetic signal shield enclosing at least a portion of said optical connector interface; and
   a second electromagnetic signal shield enclosing at least a portion of said electrical connector interface.

10. The apparatus of claim 1, wherein
    said mounting surface comprises a printed circuit board.

11. The apparatus of claim 1, wherein the optical connector interface is configured to be separably coupled to the optical network connector, and the electrical connector interface is configured to be separably coupled to the electrical network connector.

12. An apparatus comprising:
    a network element port circuit comprising
       a first input/output (I/O) port, a second I/O port and a third I/O port,
       an optical connector interface coupled to said third I/O port and configured to
          couple an optical network connector to a mounting surface, and
          couple said optical network connector to said first I/O port,
       an electrical connector interface coupled to said third I/O port and configured to
          couple an electrical network connector to said mounting surface, and
          couple the electrical network connector to said second I/O port, wherein
             said optical connector interface and said electrical connector interface are vertically aligned with one another with respect to said mounting surface; and
    an auto-media detection physical layer protocol circuit, wherein
       said first, second and third I/O ports are coupled to said auto-media detection physical layer protocol circuit.

13. The network element port circuit of claim 12, wherein
    said auto-media detection physical layer protocol circuit is configured to select a selected port from between said first and second I/O ports, process a signal received on said selected port, and transmit the processed signal from said third I/O port.

14. An apparatus comprising:
    a network element port circuit comprising
       an auto-media detection physical layer protocol circuit, and
       first, second and third input/output (I/O) ports, wherein
          said first and second I/O ports are coupled to said third I/O port;
       an optical connector interface coupled to the network element port circuit at the first I/O port;
       an electrical connector interface coupled to the network element port circuit at the second I/O port, wherein
          said optical connector interface and said electrical connector interface are substantially adjacent to one another along a line defined by an intersection of a connector-receiving plane of said network element port circuit and a connector-insertion plane of said network element port circuit.

15. The apparatus of claim 14 wherein said electrical connector interface comprises:
    a registered jack 45 (RJ-45) interface.

16. The apparatus of claim 15 wherein said optical connector interface comprises:

an interface of a small form factor pluggable (SFP) optical module.

17. The apparatus of claim 15 wherein said optical connector interface comprises:
an interface of a gigabit interface converter (GBIC) optical module.

18. The apparatus of claim 15, further comprising:
a visual indicator to indicate which of said optical connector interface and said electrical connector interface is active on said network element port circuit.

19. The apparatus of claim 18 wherein said a visual indicator comprises:
at least one of a light emitting diode and a light pipe.

20. The apparatus of claim 15, wherein
said electrical connector interface comprises an upper connector interface of said network element port circuit, and
said optical connector interface comprises a lower connector interface of said network element port circuit.

21. The apparatus of claim 14, further comprising:
an electrical isolation circuit coupled to said electrical connector interface.

22. The apparatus of claim 21 wherein said electrical isolation circuit comprises:
one or more magnetics components.

23. The apparatus of claim 14, further comprising:
a first electromagnetic signal shield enclosing at least a portion of said optical connector interface; and
a second electromagnetic signal shield enclosing at least a portion of said electrical connector interface.

24. The apparatus of claim 14, wherein
said auto-media detection physical layer protocol circuit is configured to select a selected port from between said first and second I/O ports, process a signal received on said selected port, and transmit the processed signal from said third I/O port.

25. A method comprising:
coupling an optical connector interface at a first input/output (I/O) port of a network element port circuit, wherein
said optical connector interface is further coupled to a third I/O port of said network element port circuit and to a mounting surface;
coupling an electrical connector interface at a second I/O port of said network element port circuit, wherein
said electrical connector interface is further coupled to the third I/O port of said network element port circuit and to said mounting surface such that said optical connector interface and said electrical connector interface are vertically aligned with one another with respect to said mounting surface, and
said electrical connector interface comprises a RJ-45 interface.

* * * * *